US012583113B2

(12) United States Patent     (10) Patent No.:    US 12,583,113 B2
Liu et al.                                                              (45) Date of Patent:        Mar. 24, 2026

(54) GENERALIZATION GENERATION METHOD OF INDUSTRIAL ROBOT POSE TRAJECTORIES SUPPORTING CHANGEABLE OPERATION PATH POINTS

(71) Applicant: Zhejiang University, Hangzhou (CN)

(72) Inventors: Zhenyu Liu, Hangzhou (CN); Chan Qiu, Hangzhou (CN); Guodong Sa, Hangzhou (CN); Jianrong Tan, Hangzhou (CN); Chenyang Min, Hangzhou (CN); Jingqian Luo, Hangzhou (CN)

(73) Assignee: Zhejiang University, Hangzhou (CN)

( * ) Notice: Subject to any disclaimer, the term of this patent is extended or adjusted under 35 U.S.C. 154(b) by 151 days.

(21) Appl. No.: 18/699,253

(22) PCT Filed: Dec. 19, 2023

(86) PCT No.: PCT/CN2023/139677
§ 371 (c)(1),
(2) Date: Apr. 5, 2024

(87) PCT Pub. No.: WO2025/050559
PCT Pub. Date: Mar. 13, 2025

(65) Prior Publication Data
US 2025/0236016 A1     Jul. 24, 2025

(30) Foreign Application Priority Data
Sep. 6, 2023    (CN) .......................... 202311149325.1

(51) Int. Cl.
B25J 9/16         (2006.01)
(52) U.S. Cl.
CPC ................................... B25J 9/1664 (2013.01)

(58) Field of Classification Search
CPC ........ B25J 9/1664; B25J 9/163; B25J 9/1628; B25J 9/1653; B25J 9/1656;
(Continued)

(56) References Cited

U.S. PATENT DOCUMENTS

2021/0178585 A1*  6/2021  Rozo ...................... G06N 3/006

FOREIGN PATENT DOCUMENTS

CN          111452039 B   *  5/2022   ................ B25J 9/16

OTHER PUBLICATIONS

Sylvain Calinon, "Gaussians on Riemannian Manifolds: Applications for Robot Learning and Adaptive Control", Mar. 30, 2020 (Year: 2020).*

(Continued)

*Primary Examiner* — Esvinder Singh
(74) *Attorney, Agent, or Firm* — CM Law PLLC; Robert C. Klinger

(57)                    ABSTRACT
Provided is a generalization generation method of industrial robot pose trajectories supporting changeable operation path points, which relates to the field of robot trajectory planning. The method includes: acquiring a plurality of groups of robot end pose trajectories; aligning time steps of the pose trajectories via a multi-dimensional dynamic time warping algorithm; constructing a Gaussian mixture model of robot pose trajectories in combination with a variational Bayesian method and an attitude quaternion tangent space mapping method; calculating reference pose trajectory distribution via a Gaussian mixture regression method; performing kernelized representation on pose trajectory distribution, and solving an optimal hyperparameter of a kernel function by minimizing a root mean square error of a reproduced reference trajectory; and generating the robot end pose trajectories adapted to the operation path points by updating the reference pose trajectory distribution.

5 Claims, 4 Drawing Sheets

(58) Field of Classification Search
CPC .......... G05B 2219/36087; G05B 2219/36405;
G05B 2219/36415
See application file for complete search history.

(56) References Cited

OTHER PUBLICATIONS

Wu et al, "Robot Orientation Learning Based on Interaction Primitives for Human-Robot Collaboration", Jul. 17-20, 2023 IEEE International Conference on Real-time Computing and Robotics (RCAR) | 979-8-3503-2718-2/23/$31.00 © 2023 IEEE | DOI: 10.1109/RCAR58764.2023.10249524 (Year: 2023).*
Liu et al, "Collision-free Motion Generation Based on Stochastic Optimization and Composite Signed Distance Field Networks of Articulated Robot", Jun. 7, 2023 (Year: 2023).*

* cited by examiner

Variance of trajectory points

Mean value of trajectory points

1

GENERALIZATION GENERATION METHOD OF INDUSTRIAL ROBOT POSE TRAJECTORIES SUPPORTING CHANGEABLE OPERATION PATH POINTS

CROSS-REFERENCE TO RELATED APPLICATION

This application is a national stage of International Application No. PCT/CN2023/139677, filed on Dec. 19, 2023, which claims the benefit and priority to Chinese Patent Application No. 202311149325.1, filed with the China National Intellectual Property Administration on Sep. 6, 2023. Both of the aforementioned applications are incorporated by reference herein in their entireties as part of the present application.

TECHNICAL FIELD

The present disclosure relates to the field of robot trajectory planning, in particular to a generalization generation method of industrial robot pose trajectories supporting changeable operation path points.

BACKGROUND

Industrial robots have become an indispensable part of production and manufacturing since their first appearance, which can automatically complete repetitive, dangerous and heavy tasks, while improving production efficiency and reducing production costs and risks. At present, most industrial robots installed in a production workshop can only perform specific tasks and are less intelligent. However, with the increase of product diversification demand, the operation flexibility of industrial robots needs to be improved to adapt to the increasingly flexible production environment.

Providing easy-to-program interfaces for robots is a prerequisite for widespread use of robots in production and manufacturing. However, the difficulty of programming is a limiting factor. The existing teaching programming or off-line programming requires professional engineers or developers to do a lot of work for a given task. Although it can ensure high precision completion of job tasks in a single fixed operation scene, there are problems such as long deployment time, low programming efficiency and high requirements for the professional quality of operators. When the operation scene of the robots changes, the robots cannot perform the task and need to be re-taught. Therefore, the robots cannot adapt to the changeable operation scene in the flexible manufacturing system, which hinders the further application of the robots.

Demonstration learning provides a method to improve the adaptability of the robots to different operation scenes, aiming at enabling non-professional users to allow the robots to learn the execution process of different tasks via demonstration. Imitation learning of robot motion trajectories is an important research direction of demonstration learning. The motion characteristics can be learned from a small number of teaching trajectories. By generalizing the motion characteristics in a new operation scene, the robots can adapt to the dynamic changes of the operation scene, thus realizing the flexibility of the operation path of the robots.

At present, the robot trajectory learning technology mainly includes dynamic movement primitives, probabilistic movement primitives, kernelized movement primitives and other methods, which can make the robots adapt to changing operation path points, but pays less attention to the generation of the robot attitude trajectories. The existing trajectory learning methods often project the attitude quaternion into a single Euclidean tangent space and then use a Gaussian mixture model for probability modeling, which ignores the inherent geometric constraints of the attitude quaternion and makes it difficult to generate high-precision attitude trajectories. Therefore, the trajectory generation technology based on learning still has many shortcomings. On the one hand, the traditional Gaussian mixture model does not take into account the geometric constraints of the robot pose trajectories, and the precision of probability modeling is low. On the other hand, the trajectory generation technology cannot take into account the simultaneous generation of the robot position trajectories and the robot attitude trajectories.

SUMMARY

The present disclosure provides a generation method of industrial robot pose trajectories supporting changeable operation path points, which can overcome the shortcomings of the existing teaching programming method. Based on the probability modeling of the robot pose trajectories, the reference pose trajectory distribution is calculated via the Gaussian mixture regression method, and the pose trajectory adapted to operation path points is generated via the kernelized representation of the pose trajectory distribution, thus improving the flexibility of the robot operation path.

In order to achieve the above purpose, the present disclosure uses the following technical scheme:

S1: acquiring a plurality of groups of robot end pose trajectories;

S2: aligning time steps of the plurality of groups of robot end pose trajectories to obtain an alignment set of the robot end pose trajectories;

S3: according to the alignment set of the robot end pose trajectories, constructing a Gaussian mixture model of robot pose trajectories in combination with a variational Bayesian method and an attitude quaternion tangent space mapping method;

S4: according to the Gaussian mixture model of the robot pose trajectories, obtaining reference pose trajectory distribution after calculation in combination with a method of parallel transferring of attitude quaternion covariance in a tangent space and a Gaussian mixture regression method;

S5: performing optimal kernelized representation on the reference pose trajectory distribution to obtain an optimal hyperparameter of a kernel function; and S6: updating the reference pose trajectory distribution according to operation path points of the robot, and generating robot end pose trajectories adapted to the operation path points after performing kernelized representation on the current reference pose trajectory distribution according to the optimal hyperparameter of the kernel function.

In S2, a multi-dimensional dynamic time warping method is used to ensure synchronization of position and attitude dimensions and meet attitude quaternion geometric constraints by setting a distance between trajectory points, so as to align the time steps of the plurality of groups of robot end pose trajectories.

S3 specifically includes:

based on the alignment set of the robot end pose trajectories, constructing a Gaussian mixture model of robot position trajectories by using the variational Bayesian method;

based on the alignment set of the robot end pose trajectories, constructing a Gaussian mixture model of robot attitude trajectories by using the attitude quaternion tangent space mapping method; and forming a Gaussian mixture model of robot pose trajectories with the Gaussian mixture model of robot position trajectories and the Gaussian mixture model of robot attitude trajectories.

S4 specifically includes:

calculating robot end reference position trajectories based on a Gaussian mixture regression method;

performing parallel transferring on covariance of each Gaussian component in the Gaussian mixture model of the robot pose trajectories in the attitude quaternion tangent space, replacing covariance of each Gaussian component in the traditional Gaussian mixture regression method with covariance $\Sigma_{\|i}$ in the tangent space after parallel transferring to calculate and obtain a covariance component $\hat{\Sigma}_{iq}$ of an attitude dimension of an i-th Gaussian component, obtaining a covariance matrix $\hat{\Sigma}_q$ consisted of covariance components corresponding to all Gaussian components in the attitude dimension after traversing all Gaussian components, and calculating and obtaining a mean matrix of the attitude dimension according to the covariance matrix $\hat{\Sigma}_q$, so as to obtain end reference attitude trajectories; and forming reference pose trajectory distribution with the end reference position trajectories and the end reference attitude trajectories.

In S5, an optimal hyperparameter of a kernel function is solved by minimizing a root mean square error of a reproduced reference pose trajectory distribution.

The variational Bayesian method in S3 aims at optimizing the number of Gaussian components in the Gaussian mixture model of the pose trajectories automatically, learning a whole class of probability models by using the variational Bayesian method, calculating the posterior probability on position trajectory data for each probability model, and inferring the maximum posterior distribution of parameters $\pi_k$, $\mu_k$ and $\Sigma_k$ in the Gaussian mixture model by using the variational Bayesian method.

The attitude quaternion tangent space mapping method in S3 means that the attitude quaternion is projected from the Riemannian space where the attitude quaternion is located to the Euclidean tangent space of another attitude quaternion, and can be reproduced from the tangent space back to the Riemannian space via inverse mapping of a tangent space.

The method of parallel transferring of attitude quaternion covariance in the tangent space in S4 refers to transferring an attitude quaternion covariance in a tangent space of two attitude quaternions, so as to ensure a correct representation of a dispersion in the tangent space of different attitude quaternions.

The kernelized representation method of the pose trajectory distribution in S5 refers to a kernel representation of a pose trajectory distribution by a kernel method and minimizing KL divergence between a reference pose trajectory distribution and a parameterized trajectory distribution.

For a kernelized representation of an attitude trajectory distribution, first, $\hat{\mu}_{nq}$ of a reference attitude trajectories is projected to a tangent space of an attitude trajectory starting point $q_s$. In order to ensure the consistency of an attitude quaternion covariance in different tangent spaces, a parallel transferring is performed on the covariance $\hat{\Sigma}_{nq}$ of the reference attitude trajectories is transferred from a tangent space of a mean value $\hat{\mu}_{nq}$ to the tangent space of the attitude trajectory starting point $q_s$.

A root mean square error of the reproduced reference trajectories in S5 refers to punishing a difference between a reproduced trajectory and a reference trajectory by squaring an Euclidean distance of a position dimension and a rotation distance of an attitude dimension.

The updating of the reference pose trajectory distribution in S6 refers to updating a reference pose trajectory distribution RD by using operation path points VD, and replacing trajectory points of $d(t_r, \bar{t}_m) < \Delta$ found in RD with regard to each operation path point. The covariance of each operation path point in VD is a diagonal matrix, and the diagonal element is a very small constant, indicating the precision of the trajectory adapted to the operation path points. The precisions of the position dimension and the attitude dimension can be set respectively, $d(t_r, \bar{t}_m)$ indicates an Euclidean distance between two operation path points, $t_r$ indicates a time corresponding to a reference trajectory point, and $\Delta$ indicates a very small constant.

The present disclosure has the following beneficial effects.

According to the present disclosure, a Gaussian mixed model of the robot pose trajectory is constructed in combination with a variational Bayesian method and an attitude quaternion tangent space mapping method, and the precision of probability modeling of the pose trajectories is improved while taking into account the geometric constraints of the robot pose trajectories.

According to the present disclosure, the generalization generation of the position trajectories and of the attitude trajectories is taken into account at the same time, and the generated trajectories can adapt to the changing operation path points, so that the operation path of the robot is more flexible.

To sum up, according to the present disclosure, the generalization generation of the industrial robot pose trajectories supporting changeable operation path points is achieved, so that the flexibility of an industrial robot operation path is improved.

DETAILED DESCRIPTION OF THE EMBODIMENTS

The present disclosure will be further explained with reference to the attached drawings and specific examples.

Figure 1:
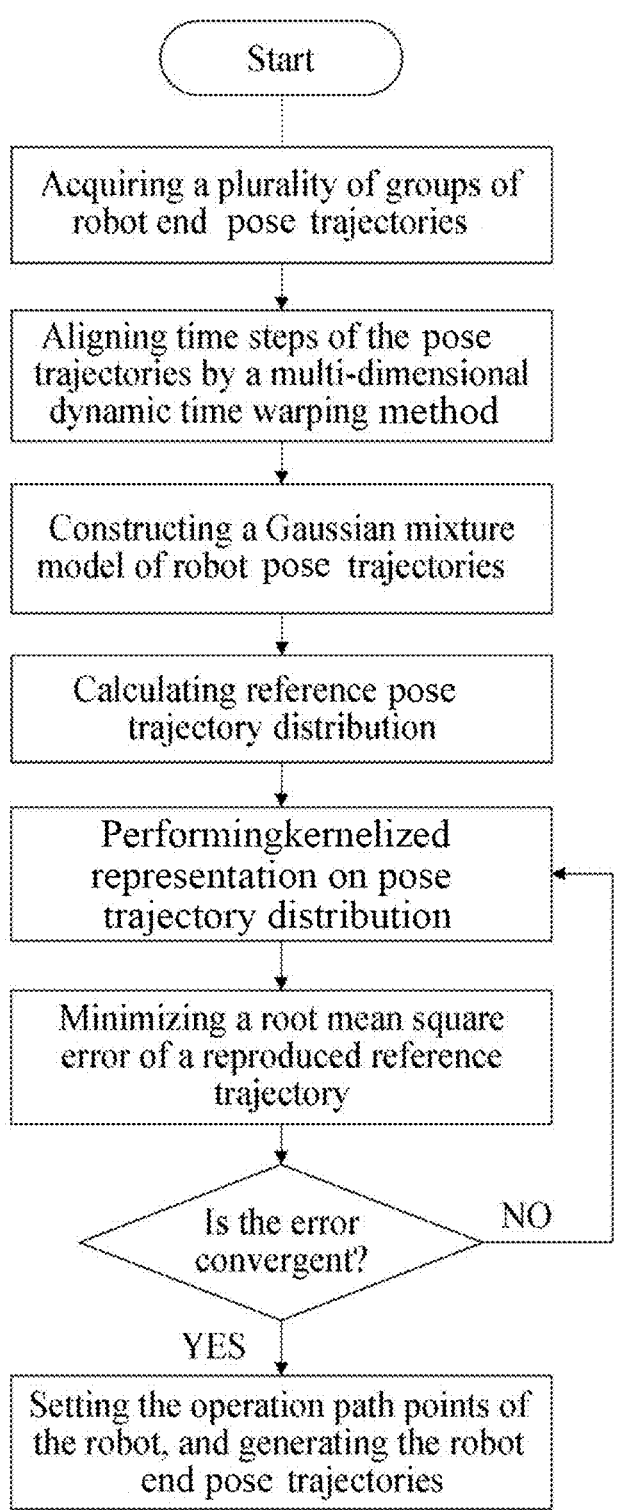
FIG. 1 is a schematic flow diagram of a method according to the present disclosure.

As shown in FIG. 1, the present disclosure gives an explanation by using a bucket handling process in industrial robot nuclear waste disposal as an example, which specifically includes the following steps.

S1: a plurality of groups of robot end pose trajectories are acquired by drag teaching, off-line programming, virtual teaching, etc.

The robot is, for example, an industrial robot, such as an ABB IRB6700 industrial robot, but is not limited thereto.

Drag teaching in S1 refers to a demonstration that a user completes a specific task by moving robot joints physically in a gravity compensation mode, while a position, an attitude and a joint angle of the end effector are recorded by its own sensor, or surrounding environment information of the robot (such as a position of an obstacle, a state of other cooperative robots or users) is recorded by an external vision system.

Off-line programming in S1 refers to creating a virtual operation scene of the robot in off-line programming software such as RobotStudio of ABB, and simulating and verifying a planned trajectory.

Virtual teaching in S1 refers to controlling a virtual environment or the remote robot conveniently and intuitively to complete the acquisition of robot end pose trajectories by means of virtual reality; augmented reality and other methods.

S2: time steps of the plurality of groups of robot end pose trajectories are aligned to obtain an alignment set of the robot end pose trajectories.

In S2, in order to solve the problem of a different time length of the robot end pose trajectories acquired each time, which is not convenient to model the probability of the robot end pose trajectory later, a multi-dimensional dynamic time warping method is used to ensure synchronization of position and pose dimensions to meet attitude quaternion geometric constraints by setting a distance between trajectory points, so as to align the time steps of the plurality of groups of robot end pose trajectories.

S2 specifically includes the following steps.

S21: the robot end pose is converted into a unit quaternion, which is a Riemannian manifold on a four-dimensional sphere.

S22: a distance between user-defined pose trajectory points is calculated, wherein the distance between two trajectory points in the position and pose dimensions is an Euclidean distance and a rotation distance, respectively. The rotation distance of two attitude quaternions is L2 regular $\|\log_f(g)\|_2$ projected in the tangent space, where each of g and f indicates an attitude quaternion.

S23: a distance matrix consisted of a distance between each pair of data points is calculated by using a dynamic programming algorithm.

S24: an alignment path between two trajectory sequences is solved according to the distance matrix. On the premise that $p_L=(N, M)$ is known, $p_{i-1}$ is calculated in a reverse order, and the optimal alignment path $p^*$ is obtained, which satisfies $p^*=(p_1, \ldots, p_L)$, where $p_L$ is a mapping coordinate of trajectory points, N and M indicate time sequence lengths of two trajectory sequences, respectively, and L indicates a length of an optimal alignment path.

S25: all pose trajectories are aligned with a target pose trajectory to obtain a plurality of groups of robot end pose trajectories after time alignment.

S3: according to the alignment set of the robot end pose trajectories, a Gaussian mixture model of robot pose trajectories is constructed in combination with a variational Bayesian method and an attitude quaternion tangent space mapping method.

Figure 2:
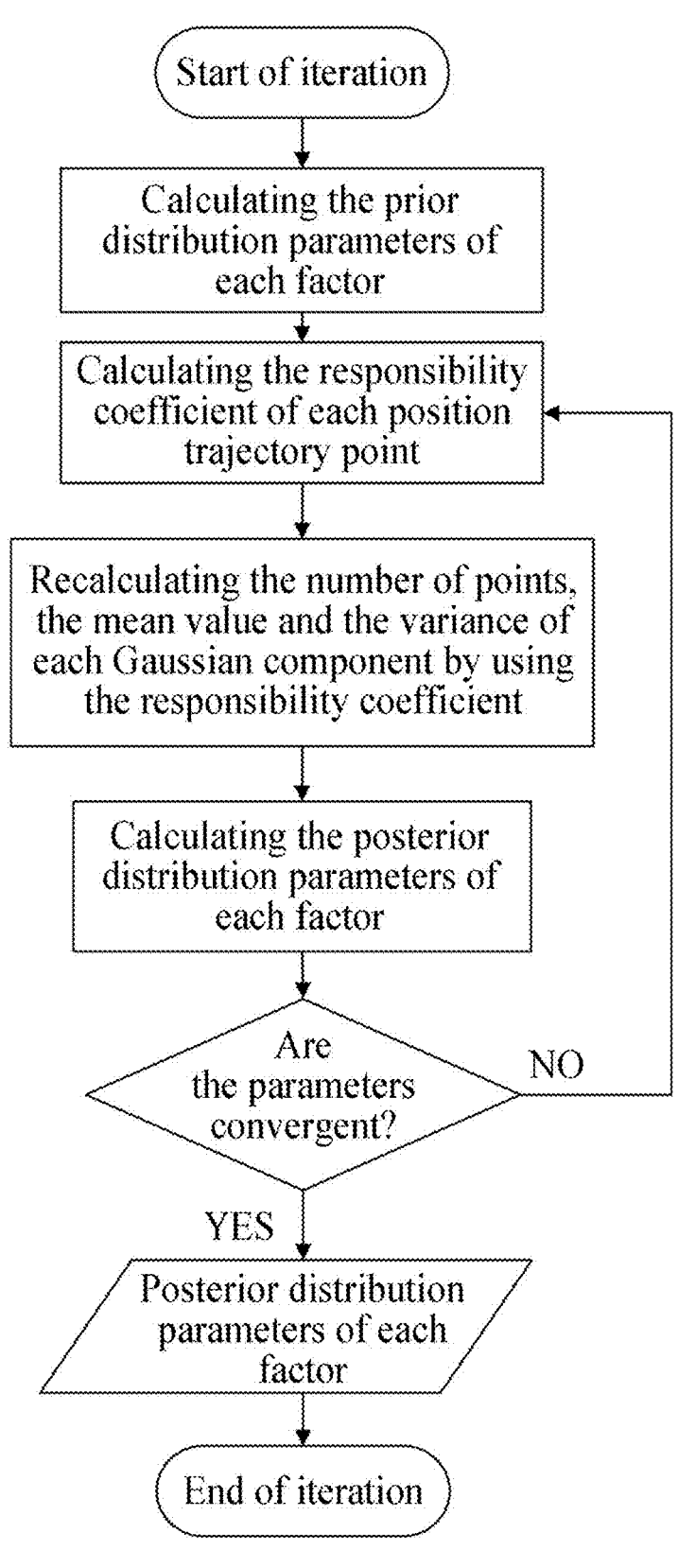
FIG. 2 is a flow chart of an algorithm of constructing a Gaussian mixture model of robot pose trajectories in step S3.

As shown in FIG. 2, S3 specifically includes:

S31: based on the alignment set of the robot end pose trajectories, constructing a Gaussian mixture model of robot position trajectories by using the variational Bayesian method:

S32: based on the alignment set of the robot end pose trajectories, constructing a Gaussian mixture model of robot attitude trajectories by using the attitude quaternion tangent space mapping method:

S321: weighting the projection of an attitude trajectory point $x_{ng}$ in the mean tangent space by a responsibility coefficient $r_{nk}$ to update the Gaussian component mean $\mu_{kq}$; and S322: estimating a dispersion of an attitude quaternion as a covariance $\Sigma_{kg}$ of the attitude quaternion in the tangent space of the Gaussian component mean $\mu_{kq}$.

A Gaussian mixture model of robot pose trajectories consists of the Gaussian mixture model of robot position trajectories and the Gaussian mixture model of robot attitude trajectories.

S4: according to the Gaussian mixture model of the robot pose trajectories, reference pose trajectory distribution is obtained after calculation in combination with a method of parallel transferring of attitude quaternion covariance in a tangent space and a Gaussian mixture regression method.

Figure 3:
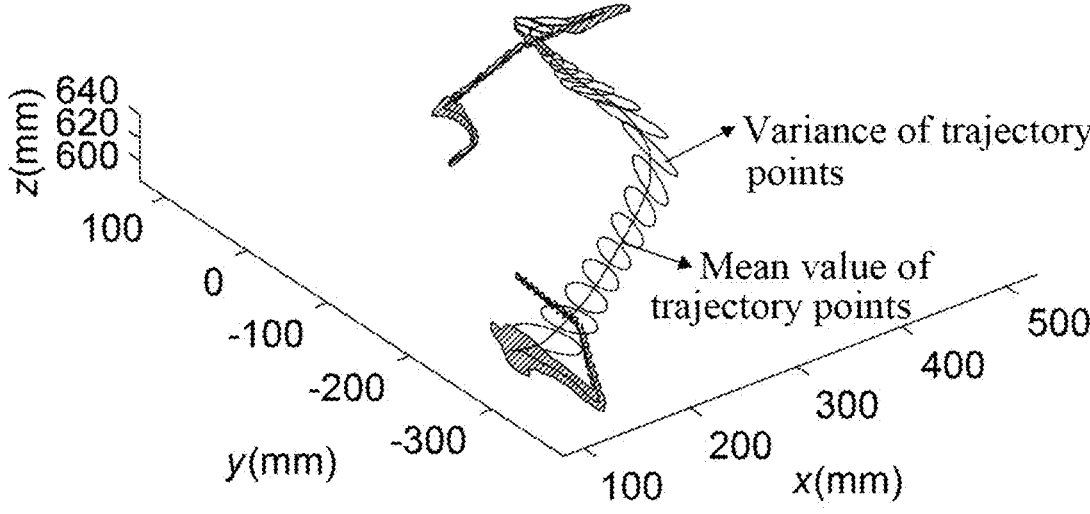
FIG. 3 is a schematic diagram of reference position trajectories calculated in step S4.

S4 specifically includes:

S41: calculating the end reference position trajectories of the robot bucket handling task based on the traditional Gaussian mixture regression method, as shown in FIG. 3:

S42: performing parallel transferring on covariance of each Gaussian component in the Gaussian mixture model of the robot pose trajectories in the attitude quaternion tangent space, replacing covariance of each Gaussian component in the traditional Gaussian mixture regression method with covariance $\Sigma_{\|i}$ in the tangent space after parallel transferring to calculate and obtain a covariance component $\hat{\Sigma}_{iq}$ of an attitude dimension of the i-th Gaussian component, obtaining a covariance matrix $\hat{\Sigma}_q$ consisted of covariance components corresponding to all Gaussian components in the attitude dimension after traversing all Gaussian components, and calculating and obtaining a mean matrix of the attitude dimension according to the covariance matrix $\hat{\Sigma}_q$, so as to obtain end reference attitude trajectories; and S43: forming reference pose trajectory distribution with the end reference position trajectories and the end reference attitude trajectories: where each trajectory point in the calculated reference pose trajectory distribution is $(t_{nr}, \hat{\mu}_{npr}, \hat{\Sigma}_{npr}, \hat{\mu}_{nqr}, \hat{\Sigma}_{nqr})$, which includes time point tur, the end position mean $\hat{\mu}_{npr}$, the end position variance $\hat{E}_{npr}$, the end position mean $\hat{\mu}_{nqr}$, and the end position variance $\hat{E}_{nqr}$.

S5: optimal kernelized representation is performed on the reference pose trajectory distribution to obtain an optimal hyperparameter of a kernel function.

S5 specifically includes:

S51: performing the kernelized representation on the end position trajectory distribution by a kernel method and minimizing KL divergence between the reference pose trajectory distribution and the parameterized trajectory distribution;

S52: for the kernelized representation of the end attitude trajectory distribution, first, projecting $\hat{\mu}_{nq}$ of the end reference attitude trajectories to the tangent space of the attitude trajectory starting point $q_s$;

S53: in order to ensure consistency of the attitude quaternion covariance in different tangent spaces, performing parallel transferring on the covariance $\hat{\Sigma}_{nq}$ of the end reference attitude trajectories from the tangent space of the mean value $\hat{\mu}_{nq}$ to the tangent space of the attitude trajectory starting point $q_s$.

S54: selecting an appropriate kernel function from a Gaussian kernel, a Cauchy kernel and a periodic kernel for the bucket handling task of the robots:

S55: punishing a difference between the reproduced trajectory and the reference trajectory by squaring the Euclidean distance of the position dimension and the rotation distance of the attitude dimension and denoting the result as a root mean square error; and S56: solving an optimal hyperparameter of the kernel function by minimizing the root mean square error of the reproduced end reference pose trajectories.

S6: the reference pose trajectory distribution is updated according to operation path points of the robot, and the robot end pose trajectories adapted to the operation path points are generated after performing kernelized representation on the current reference pose trajectory distribution according to the optimal hyperparameter of the kernel function.

Figure 4:
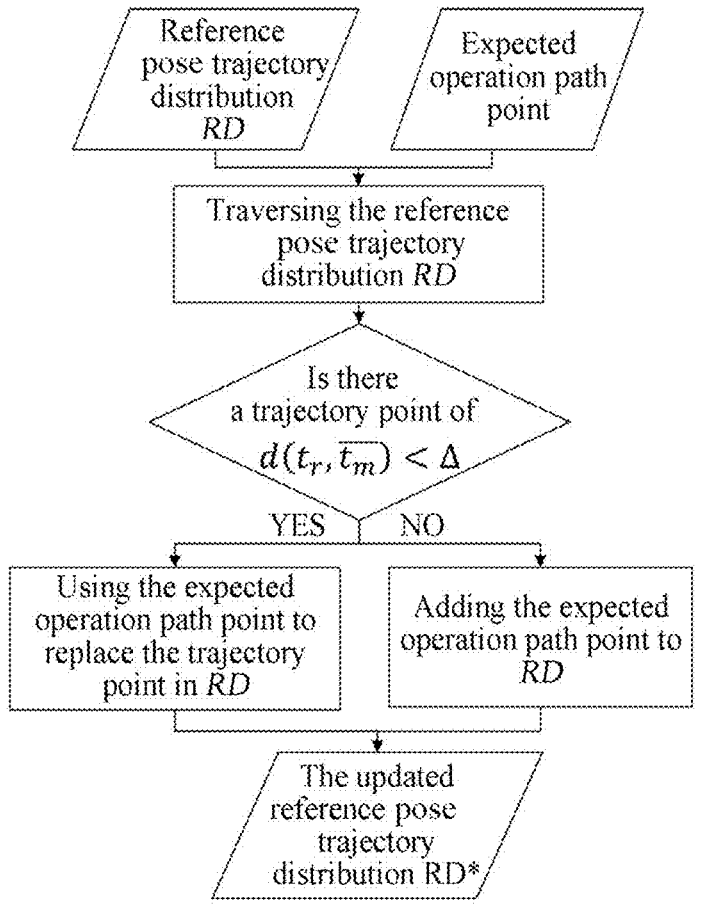
FIG. 4 is a flow chart of an algorithm of updating reference pose trajectory distribution in step S62.
Figure 5:
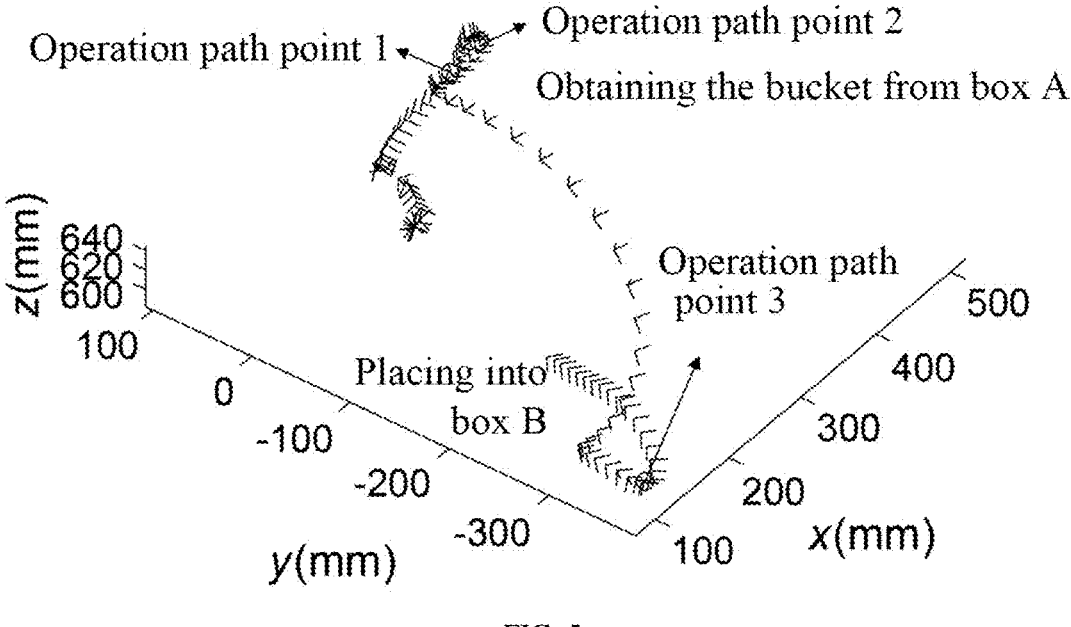
FIG. 5 is a schematic diagram of industrial robot end pose trajectories generated in step S63.

S6 specifically includes the following steps:

S61: setting operation path points according to the change of the robot bucket handling operation scene, where each operation path point is denoted as $(\hat{t}_m, \bar{p}_m, \bar{q}_m, \hat{\Sigma}_{pm}, \hat{\Sigma}_{qm})$, wherein $\hat{t}_m$ indicates the expected time to pass through the operation path point. $\hat{p}_m$ and $\bar{q}_m$ indicate the expected end position and attitude, respectively, and $\hat{\Sigma}_{pm}$ and $\hat{\Sigma}_{qm}$ indicate the covariance adapted to the operation path points, respectively: the covariance is a diagonal matrix, in which the diagonal element is a very small constant, indicating the precision of the trajectory adapted to the operation path points; and the precisions of the position dimension and the attitude dimension can be set respectively:

S62: for each expected operation path point, updating the reference pose trajectory distribution according to the flow in FIG. 4; and S63: generating the robot end pose trajectories adapted to the operation path points by using the kernelized representation of the pose trajectory distribution, in which the generated end pose trajectories of the industrial robot are shown in FIG. 5.

In the bucket handling process of the industrial robot nuclear waste disposal, the working space of the robot is narrow: The initial pose of the bucket on a working box support platform will change. There are certain requirements for the pose of the bucket on the working box support platform. Furthermore, it is necessary to ensure that the robot does not collide with the surrounding environment. Therefore, the robot needs to have the ability of flexible operation. The end pose trajectory generated by the present disclosure can make the industrial robot adapt to the changing operation path points of the bucket handling process, and improve the flexibility of its operation path.

The above-mentioned embodiments are used to explain the present disclosure, rather than limit the present disclosure. Any modification and change made to the present disclosure within the spirit and the scope of protection of claims of the present disclosure fall within the scope of protection of the present disclosure.

What is claimed is:

1. A generalization generation method of industrial robot pose trajectories supporting changeable operation path points, comprising the following steps:

S1: acquiring a plurality of groups of robot end pose trajectories;

S2: aligning time steps of the plurality of groups of robot end pose trajectories to obtain an alignment set of the robot end pose trajectories;

S3: according to the alignment set of the robot end pose trajectories, constructing a Gaussian mixture model of robot pose trajectories in combination with a variational Bayesian method and an attitude quaternion tangent space mapping method;

S4: according to the Gaussian mixture model of the robot pose trajectories, obtaining reference pose trajectory distribution after calculation in combination with a method of parallel transferring of attitude quaternion covariance in a tangent space and a Gaussian mixture regression method;

S5: performing optimal kernelized representation on the reference pose trajectory distribution to obtain an optimal hyperparameter of a kernel function; and S6: updating the reference pose trajectory distribution according to operation path points of a robot, and generating robot end pose trajectories adapted to the operation path points after performing kernelized representation on a current reference pose trajectory distribution according to the optimal hyperparameter of the kernel function.

2. The generalization generation method of industrial robot pose trajectories supporting changeable operation path points according to claim 1, wherein in S2, a multi-dimensional dynamic time warping method is used to ensure synchronization of position and attitude dimensions and meet attitude quaternion geometric constraints by setting a distance between trajectory points, so as to align the time steps of the plurality of groups of robot end pose trajectories.

3. The generalization generation method of industrial robot pose trajectories supporting changeable operation path points according to claim 1, wherein S3 specifically comprises:

based on the alignment set of the robot end pose trajectories, constructing a Gaussian mixture model of robot position trajectories by using the variational Bayesian method;

based on the alignment set of the robot end pose trajectories, constructing a Gaussian mixture model of robot attitude trajectories by using the attitude quaternion tangent space mapping method; and forming the Gaussian mixture model of robot pose trajectories by the Gaussian mixture model of robot position trajectories and the Gaussian mixture model of robot attitude trajectories.

4. The generalization generation method of industrial robot pose trajectories supporting changeable operation path points according to claim 1, wherein S4 specifically comprises:

calculating robot end reference position trajectories based on the Gaussian mixture regression method;

performing parallel transferring on covariance of each Gaussian component in the Gaussian mixture model of the robot pose trajectories in the tangent space, replacing covariance of each Gaussian component in the Gaussian mixture regression method with covariance $\Sigma_{\|i}$ in the tangent space after parallel transferring to calculate and obtain a covariance component $\hat{\Sigma}_{iq}$ of an attitude dimension of an i-th Gaussian component, obtaining a covariance matrix $\hat{\Sigma}_q$ consisted of covariance components corresponding to all Gaussian components in the attitude dimension after traversing all Gaussian components, and calculating and obtaining a mean matrix of the attitude dimension according to the covariance matrix $\hat{\Sigma}_q$ so as to obtain end reference attitude trajectories; and forming reference pose trajectory distribution with the end reference position trajectories and the end reference attitude trajectories.

5. The generalization generation method of industrial robot pose trajectories supporting changeable operation path points according to claim 1, wherein in S5, the optimal hyperparameter of the kernel function is solved by minimizing a root mean square error of a reproduced reference pose trajectory distribution.

* * * * *